UNITED STATES PATENT OFFICE.

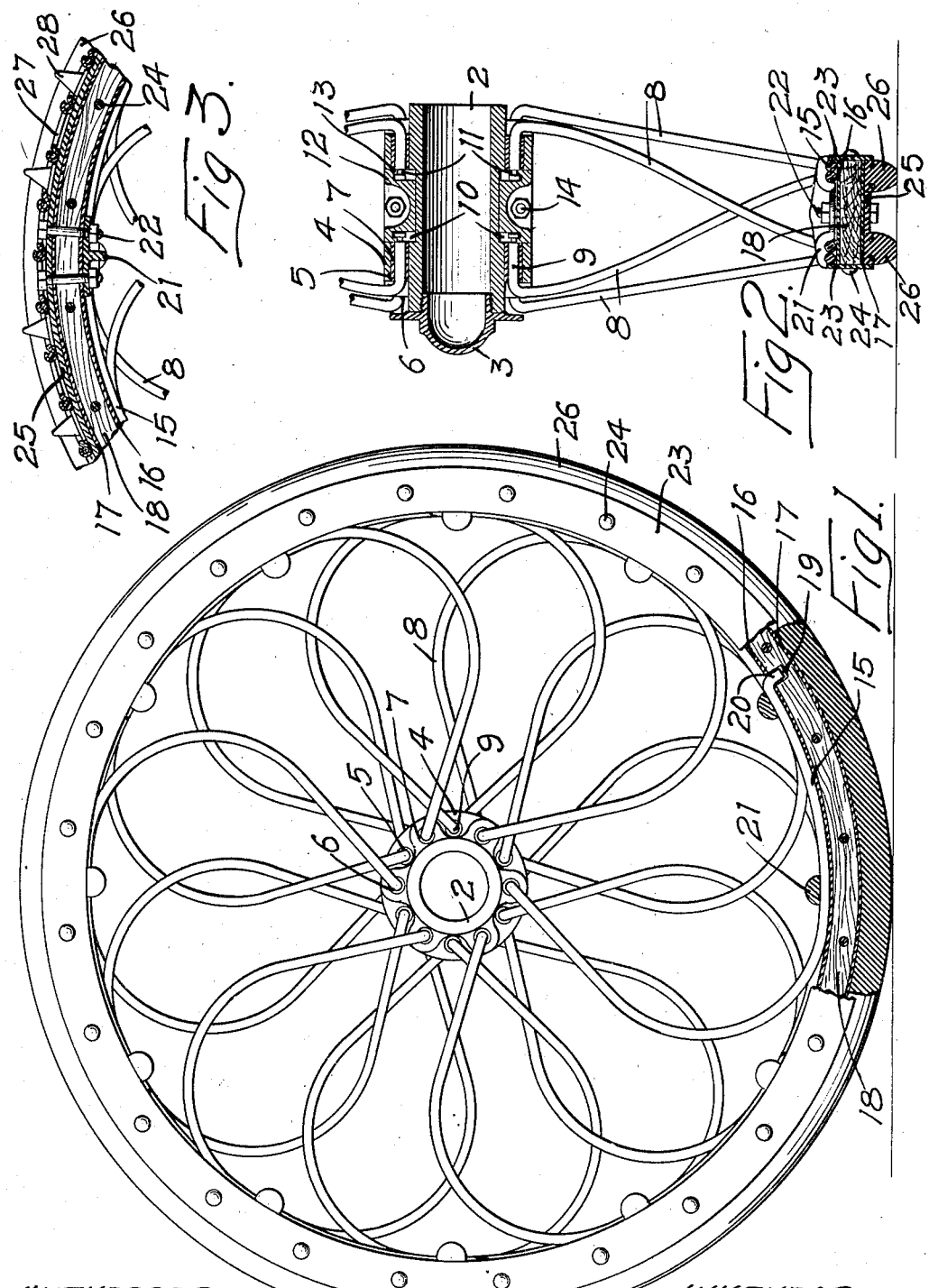

ORA W. WILLIAMS, OF MINNEAPOLIS, MINNESOTA, ASSIGNOR OF ONE-HALF TO W. H. GARDNER, OF MINNEAPOLIS, MINNESOTA.

WHEEL.

1,025,555.   Specification of Letters Patent.   Patented May 7, 1912.

Application filed February 24, 1908. Serial No. 417,254.

*To all whom it may concern:*

Be it known that I, ORA W. WILLIAMS, of Minneapolis, Hennepin county, Minnesota, have invented certain new and useful Improvements in Wheels, of which the following is a specification.

The object of my invention is to provide a wheel having spokes of sufficient resiliency to permit the use of a non-pneumatic tire and form a yielding support for a vehicle.

A further object is to simplify and improve the type of wheel shown and described in a certain pending application Serial No. 338,889, filed by me October 15, 1906.

The invention consists generally in various constructions and combinations, all as hereinafter described and particularly pointed out in the claims.

In the accompanying drawings, forming part of this specification, Figure 1 is a side elevation of a wheel partially broken away, embodying my invention. Fig. 2 is a sectional view of the wheel through the hub and rim. Fig. 3 is a detail sectional view of a portion of the rim.

In the drawing, 2 represents the hub cylindrical in form adapted to receive and support the axle skein, and having a cap 3 at one end. The periphery of said hub on each side of the transverse center thereof is provided with annular webs 4 having sockets 5 and 6 therein for the ends of the spokes. These sockets extend lengthwise of the hub and are of sufficient size to receive several metal bushings 7 into which the ends of the spokes are inserted. The spokes 8 correspond substantially in form to one another and have inwardly turned ends 9 adapted to project through their bearings in the bushings into an annular recess 10 provided at the center of the hub. The ends of these spokes have annular grooves 11 therein and curved locking plates 12 are provided to fit into the annular grooves in the hub and have lips 13 which are adapted to enter the grooves in the ends of the spokes and lock them in their bearings. The plates 12 are preferably semi-circular in form and made in two parts and are held together by bolts 14 when the wheel is assembled. The spokes are arranged in groups at each end of the hub, there being an inner and an outer group at each end, the spokes of the outer groups radiating outwardly to the edge of the rim on the same side of the wheel. The spokes of the inner groups are inclined to cross the plane of the wheel or are staggered with respect to the spokes of the outer groups and the spokes of the inner groups at each end of the hub have their outer ends secured to the edges of the rim on the opposite side of the wheel. This construction results in the inner groups of spokes at one end of the hub crossing the corresponding spokes of the same group at the other end of the hub, and greatly strengthens and braces the wheel against lateral strain. The outer ends of the contiguous spokes of different groups at the same end of the hub, are oppositely turned near the rim and have curved portions 15 that are adapted to bear on the rim. This rim is preferably made up of an inner metallic ring 16, an outer ring 17 and fellies of wood or other suitable material 18 between them. The inner ring has sockets 19 at intervals therein and the ends 15 of the spokes have outwardly turned portions 20 adapted to enter said sockets. The spokes of the inner groups are secured to the rim in a corresponding manner, and have substantially the same bearing surface thereon.

Clamp plates 21 are provided extending crosswise of the rim and adapted to bear on the ends of the spokes and lock them rigidly against the ring 16. There are preferably two of these clamps for each pair of spokes, each clamp engaging the ends of two spokes on each side of the wheel. The clamps are held in place by bolts 22 passing through the wheel rim. Plates 23 are provided upon each side of the rim and are secured thereto by bolts 24. The bolts 22 pass through a centrally arranged ring 25 on the periphery of the rim and on each side of the ring 25 between it and the plates 23 tread surfaces, preferably consisting of hard rubber tires 26, are provided. These tread surfaces or tire are of ordinary construction and are mounted on the rim in the usual way.

I prefer also to provide a grip chain 27 having a series of teeth 28 adapted to be placed on the wheel between the tread surfaces, the teeth projecting out beyond the tires 26 and adapted to dig into the snow or ice and prevent lateral skidding of the wheel. The spokes are made of spring material of suitable gage, and as indicated plainly in Fig. 1 the inner spokes radiating from one end of the hub are turned inwardly to the other side of the wheel and cross the corresponding spokes radiating from the hub on that side, thus bracing the wheel against lateral strain, as when turning a corner at high speed. The outer ends of the spokes being rigidly secured at two points to the wheel rim will be firmly held and the strain will be evenly distributed around the wheel. The inner ends of the spokes may be free to turn in their bearings in the hub and prevent breakage when the spokes are subjected to an unusual strain.

The bushings at the inner ends of the spokes may be of metal as described, or I may employ a yielding material such as rubber. The wheel may be made in different sizes and the spokes of different cross sectional area or gage, according to the character of the vehicle upon which the wheel is to be used.

I claim as my invention:

1. A wheel comprising a hub, and a series of resilient spokes radiating from each end of said hub on curved lines, the outer portions of corresponding spokes at opposite ends of the hub being oppositely curved and crossing one another and the plane of the wheel, a rim, said spokes flexing in a direction parallel substantially with the plane of the wheel and said spokes having their outer ends secured to said rim on opposite sides of the peripheral center thereof.

2. A wheel, comprising a hub, and a series of resilient spokes radiating therefrom on curved lines at each end of the hub, the spokes on each end of the hub consisting of an inner and outer group, the spokes of each inner group being inwardly turned and intersecting the opposite spokes of the corresponding group at the other end of the hub, a rim, and means for securing the outer portions of said spokes to said rim.

3. A wheel comprising a rim, a hub and a series of resilient spokes radiating therefrom, said spokes consisting of inner and outer groups at each end of the hub, the spokes of the outer groups radiating to the edge of the rim on the same side of the wheel and the spokes of the inner groups crossing the plane of the wheel and one another to the edges of the rim on the opposite side of the wheel.

4. A wheel comprising a hub and a series of resilient spokes radiating therefrom on curved lines, a rim, some of said spokes radiating to the edge of the rim on the same side of the wheel and others of said spokes crossing the plane of the wheel to the edge of the rim on the opposite side of the wheel, said spokes flexing in a direction parallel substantially with the plane of the wheel and means for securing the outer ends of said spokes to the rim.

5. The combination, with a hub having annular webs formed thereon and bearings therein, of spokes having inwardly turned ends fitting within said bearings and provided with annular grooves in said ends, and locking plates inclosing said hub between said webs, and having lips to enter said grooves and lock said spokes in said bearings.

6. A vehicle wheel comprising a hub, a rim, longitudinal sockets in the end portions of the hub, and curved spring spokes having ends secured in the sockets and their outer ends secured to the rim, a part of the spokes extending from the sockets to the corresponding edge portion of the rim, and others of the spokes crossing to the opposite edge of the rim.

7. A vehicle wheel comprising a hub having enlarged portions with longitudinal sockets therethrough, the outer ends of the alternating sockets on each end portion of the hub being in different vertical planes, a series of curved resilient spokes extending from the sockets, the spokes from one set of sockets extending to the corresponding edge of the rim, and the spokes of the next set of sockets crossing to the opposite edge of the rim, and a rim secured to the outer ends of the spokes.

8. A vehicle wheel comprising a hub, a rim, and curved spring spokes having their inner ends secured to the hub and their outer ends secured to the rim, a part of the spokes extending from one end portion of the hub to the corresponding edge portion of the rim, and others of the spokes crossing to the opposite edge of the rim.

9. A vehicle wheel comprising a rim, a hub having annular webs formed thereon and bearings therein, resilient spokes having inwardly turned ends fitting within said bearings and transverse grooves in said ends, and locking plates engaging said grooves.

In witness whereof, I have hereunto set my hand this 15th day of February 1908.

ORA W. WILLIAMS.

Witnesses:
RICHARD PAUL,
J. W. BYINGTON.